United States Patent [19]

Wolf et al.

[11] 3,714,093
[45] Jan. 30, 1973

[54] SPIRO [HETEROCYCLOALKYL-2'(1'H)-QUINAZOLINE]-4'(3'H)-ONES

[75] Inventors: Milton Wolf, West Chester; James L. Diebold, Havertown, both of Pa.

[73] Assignee: American Home Products Corporation, New York, N.Y.

[22] Filed: May 19, 1970

[21] Appl. No.: 38,910

[52] U.S. Cl................260/251 QA, 260/256.4 Q, 260/256.5 R, 424/251

[51] Int. Cl................C07d 51/48

[58] Field of Search...260/251 QA, 256.4 Q, 256.5 R

[56] References Cited

UNITED STATES PATENTS 3,375,250   3/1968   Kirchner et al...............260/256.4

Primary Examiner—Alex Mazel
Assistant Examiner—R. V. Rush
Attorney—Andrew Kafko, Joseph Martin Weigman, Dwight J. Potter, Vito Victor Bellino and Robert Wiser

[57] ABSTRACT

This invention relates to spiro[heterocycloalkyl-2'(1'H)-quinazolin]-4'(3',H)-ones having the formula:

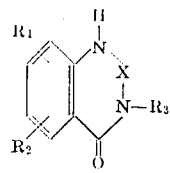

wherein $R_1$ and $R_2$ are selected independently from the group consisting of hydrogen, halogen, lower alkyl, phenyl(lower)-alkyl, phenyl, halophenyl, lower alkylphenyl, lower alkoxyphenyl, lower alkoxy, lower alkylthio, phenoxy, phenthio, nitro and trifluoromethyl; $R_3$ is selected from the group consisting of hydrogen, lower alkyl, phenyl, halophenyl, lower alkylphenyl, lower alkoxyphenyl, phen(lower)alkyl and X is selected from the group consisting of

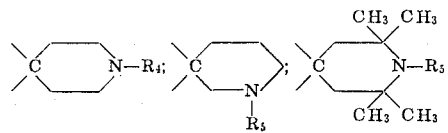

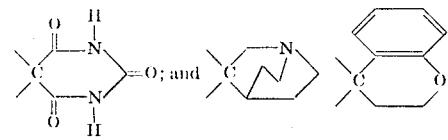

wherein $R_4$ and $R_5$ are selected from the group consisting of hydrogen, lower alkyl, phen(lower)alkyl, halophenyl(lower)alkyl, lower alkylphenyl(lower)alkyl and lower alkoxyphenyl(lower)alkyl. The compounds exhibit anti-amebic activity.

10 Claims, No Drawings

SPIRO [HETEROCYCLOALKYL-2'(1'H)-QUINAZOLINE]-4'(3'H)-ONES

The invention generally relates to new and novel spiro[heterocycloalkyl-2'(1'H)-quinazolin]-4'(3'H)-ones. Particularly it relates to said new and novel compounds wherein the cycloalkyl moiety is piperidine, quinuclidine, pyrimidine or chroman. More particularly, this invention relates to compounds having the formula:

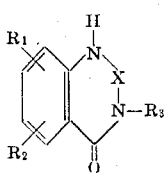

wherein $R_1$ and $R_2$ are selected independently from the group consisting of hydrogen, halogen, lower alkyl, phenyl(lower)alkyl, phenyl, halophenyl, lower alkylphenyl, lower alkoxyphenyl, lower alkoxy, lower alkylthio, phenoxy, phenthio, nitro and trifluoromethyl; $R_3$ is selected from the group consisting of hydrogen, lower alkyl, phenyl, halophenyl, lower alkylphenyl, lower alkoxyphenyl, phen(lower)alkyl and di(lower)alkylamino(lower)alkyl; and X is selected from the group consisting of

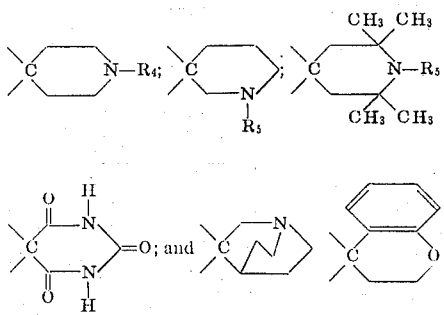

wherein $R_4$ and $R_5$ are selected from the group consisting of hydrogen, lower alkyl, phen(lower)alkyl, halophenyl(lower)alkyl, lower alkylphenyl(lower)alkyl and lower alkoxyphenyl(lower)alkyl and the acid addition salts thereof. As employed herein the term "lower alkyl", "lower alkoxy" and the like include both branch and straight chain moieties having from one to six carbon atoms. The term "halo" represents the halogen atoms, i.e. chlorine, bromine, iodine and fluorine.

The novel compounds of the present invention may be prepared by contacting a 2-aminobenzamide with a heterocycloalkanone in the presence of a catalyst such as a weak acid or a Lewis acid and a reaction inert organic solvent according to the reaction scheme:

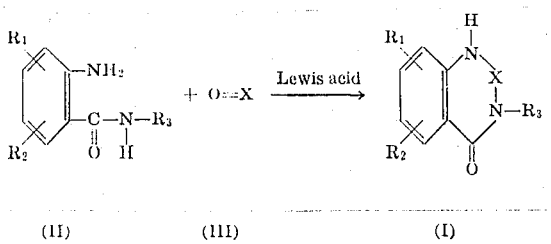

wherein $R_1$, $R_2$, $R_3$ and X are as set forth previously. In practicing the process outlined above, a substantially equimolar mixture of the reactants is admixed, in a reaction inert organic solvent if necessary, and reacted by contacting at about the reflux temperature of the mixture for a period of time ranging from about one up to twenty hours. The resulting compound may be recovered by routine procedures. This would include evaporating the reaction mixture leaving a residue which is then dissolved in an appropriate inert solvent, i.e. ether, ethyl acetate, aqueous tetrahydrofuran, tetrahydrofuran, water and methylene chloride. The solution may then be basified with an appropriate base, i.e. sodium hydroxide and the solvent evaporated providing the compound which may then be recrystallized from an appropriate solvent, i.e. tetrahydrofuran-benzene, acetonitrile, n-propyl alcohol, methylcyclohexane, ethanol, tetrahydrofuran-acetonitrile, benzene-hexane and ether. The expression "reaction inert organic solvent" as used herein refers to organic solvents which dissolve the reacting components without interfering with the reaction. The starting materials of formula (I) are known to those skilled in the art or may be prepared by methods set forth in or analogous to those set forth in Clark, J. Org. Chem., 9, 55 (1944), Staiger and Wagner, J. Org. Chem., 13, 347 (1948) and 18, 1427 (1953). The starting materials of formula (II) are well-known to those skilled in the art or may be prepared by conventional methods. The term "Lewis acid" refers to compounds in which one atom of the group has an incomplete valence shell and lacks two electrons, i.e. zinc chloride, aluminium chloride. The term "weak acid" includes all acids which are not freely dissociable and have a dissociation constant greater than $10^{-5}$.

The compounds of the present invention demonstrate antiamebic activity in vitro, when tested as follows: The substance to be tested is utilized in a test based on that described by Thompson, et al., Antibio. & Chemo. 6 (1956) 337–50 by incorporating and diluting in the aqueous phase of modified Boeck-Drbohla diphasic medium fortified with rice starch. The medium is inoculated with polybacteria and a known number of trophozoites of E. Histolytica NIH 200. After 48 hours inculation at 35° C. the trophozoites are counted. The results are expressed in Minimal Inhibitory Concentration (MIC) in mcg./ml, the least amount of test substance that completely inhibits the E. Histolytica. The compounds of the present invention are effective in this test at a concentration of from 250 ug/ml to about 1,000 ug/ml.

3

Certain compounds of the present invention demonstrate activity as central nervous system depressants useful in calming animals when administered orally or intraperitoneally to mice in a dosage range of from 12.7 mg./kg. to 400 mg./kg. and the resulting effects observed. Compounds which demonstrated activity in this test include, 1-methyl-spiro[piperidine-4,2'(1'H)-quinazolin]-4'(3'H)-one; 1-benzyl-3'-butyl-6'-chlorospiro[piperidine-4,2'(1'H)-quinazolin]-4'(3'H)-one; 2,2,6,6-tetramethylspiro[piperidine-4,2'(1'H)-quinazolin]-4'(3'H)-one; 6'-chloro-1-methylspiro[piperidine-4,2'(1'H)-quinazolin]-4'(3'H)-one; 3'-butyl-6'-chloro-1-methylspiro[piperidine-4,2'(1'H)-quinazolin]-4'(3'H)-one; spiro[quinazolin-2(1H),3'-quinuclidin]-4(3H)-one, and 6'-chlorospiro[chroman-4,2'(1'H)-quinazolin]-4'-(3'H)-one.

Additionally, certain compounds of the present invention demonstrated activity as bronchodilator agents. This was determined in a test similar to that described in Siegmund et al, J. Pharmacol., 90:254; 1947 and 97:14, 1949, whereby the bronchodilation activity of compound is determined by its ability to protect a guinae pig against the broncho-constrictor effects of a histamine spray. Compounds which were active when tested by this method include: 1-methylspiro[piperidine-4,2'(1'H)-quinazolin]-4'(3'H)-one; 1-benzyl-3'-butyl-6'-chlorospiro[piperidine-4,2'(1'H)-quinazolin]-4'(3'H)-one and 6'-chloro-1-ethylspiro[piperidine-3,2'(1H)-quinazolin]-4'(3'H)-one.

The antiamebic activity of the compounds of the present invention are useful and valuable in a variety of important fields of use. For example, they can be formulated and used in amebicidally active institutional cleaning compositions, and in soaps and detergents. The compositions are employed in washing in hospitals and homes, instruments used in medicine and clothing used in bacteriology laboratories, and floors, walls and ceilings in which a background free of ameba is desired. They are supplied according to the desired end-use as powders, solutions, suspensions and the like, containing the active substance generally in concentrations of 0.1% to 0.7% by weight, or even as much as 1%, 1.5%, 1.8%, 2% and up to about 10%. In washing solutions, e.g. for hospitals and homes, the active compounds of this invention will be used generally in the range of from about 0.02% up to about .25% by weight.

The following examples are exemplary of the invention herein described:

Example I

A mixture of o-aminobenzamide (13.6 g, 0.1 m), 1-methyl-4-piperidone (11.3 g, 0.1 m) and trifluoroacetic acid (50 ml) is refluxed for two hours. The solution is evaporated and the residue dissolved in ether and extracted with a 50% aqueous sodium hydroxide solution. After drying over anhydrous sodium sulfate, the ether is evaporated and the residue is triturated with hexane. The crude product is recrystallized from tetrahydrofuran-benzene to give 1-methylspiro[piperidine-4,2'(1'H)-quinazolin]-4'(3'H)-one, m.p. 189–91° C. (uncorrected).

Anal. Calcd for $C_{13}H_{17}N_3O$: C, 67.50; H, 7.41; N, 18.17.
Found: C, 67.36; H, 7.67; N, 18.43.

Example II

A mixture of 2-amino-5-chlorobenzamide (20.0 g, 0.117 m), 1-methyl-4-piperidone (13.2 g, 0.117 m) and trifluoroacetic acid (100 ml) is refluxed for three hours. The reaction mixture is evaporated affording a solid which is dissolved in warm tetrahydrofuran. After cooling, the solution is basified with aqueous sodium hydroxide, and diluted with water (2.5 l). The solid which separates is filtered (2.70 g, 87%). Recrystallization from n-propyl alcohol affords 6'-chloro-1-methylspiro[piperidine-4,2'(1'H)-quinazolin]-4'(3'H)-one as a crystalline solid, m. p. 252–4° C. decomposition (uncorrected).

Anal. Calcd for $C_{13}H_{16}ClN_1N_3O$; C, 58.77; H, 6.07; N, 15.82.
Found: C, 58.79; H, 6.15; N, 15.71.

In a similar manner, using the appropriate starting materials, the following compounds are provided:

6'-fluorospiro[piperidine-4,2'(1'H)-quinazolin]-4'(3'<⅔H)-one;

1,7'-dimethylspiro[piperidine-4,2'(1'H)-quinazolin]-4'(3'H)-one;

6'-benzyl-1-ethylspiro[piperidine-4,2'(1'H)-quinazolin]-4'(3'H)-one;

1-methyl-8'-phenylspiro[piperidine-4,2'(1'H)-quinazolin]-4'(3'H)-one;

6'-(p-bromophenyl)-1-propylspiro[piperidine-4,2'(1'H)-quinazolin]-4'(3'H)-one;

6'-(p-bromophenyl)-1-propylspiro[piperidine-4,2'(1'H)-quinazolin]-4'(3'H)-one;

7'-(p-anisyl)-1-butylspiro[piperidine-4,2'(1'H)-quinazolin]-4'(3'H)-one;

6'-methoxy-1-methylspiro[piperidine-4,2'(1'H)-quinazolin]-4'(3'H)-one;

1-ethyl-6'-(methylthio)spiro[piperidine-4,2'(1'H)-quinazolin]-4'(3'H)-one;

6'-cyanospiro[piperidine-4,2'(1'H)-quinazolin]-4'(3'<⅔H)-one;

1-ethyl-5'-trifluoromethylspiro[piperidine-4,2'(1'H)-quinazolin]-4'(3'H)-one;

6'-benzyl-5'-bromo-1-methylspiro[piperidine-4,2'(1'H)-quinazolin]-4'(3'H)-one;

1,7'-dimethyl-6'-phenylspiro[piperidine-4,2'(1'H)-quinazolin]-4'(3'H)-one; and 1-ethyl-6'-nitro-7'-phenylspiro[piperidine-4,2'(1'H)-quinazolin]-4'(3'H)-one.

Example III

A mixture of 2-amino-5-chloro-N-butylbenzamide (22.6 g, 0.1 m), 1-methyl-4-piperidone (11.3 g, 0.1 m) and acetic acid (150 ml) is refluxed for eight hours. The solution is evaporated and the residue treated with methylene chloride and an aqueous sodium hydroxide solution. The methylene chloride solution is dried over anhydrous sodium sulfate and evaporated to dryness. After the residue is extracted with hot hexane, it it recrystallized from methylcyclohexane affording 3'-butyl-6'-chloro-1-methylspiro-[piperidine-4,2'(1'H)-quinazolin]-4'(3'H)-one as a crystalline solid (10.0 g, 31.0%), m.p. 159–60° C. (uncorrected).

Anal. Calcd for $C_{17}H_{24}ClN_3O$: C, 63.43; H, 7.51; N, 13.05.
Found: C, 63.79; H, 7.68; N, 13.28.

In a similar manner, using the appropriate starting materials, the following compounds are provided:

3'-ethyl-6'-iodospiro[piperidine-4,2'(1'H)-quinazolin]-4'(3'H)-one;

1-ethyl-3'-phenyl-7'-propylspiro[piperidine-4,2'(1'H)-quinazolin]-4'(3'H)-one;

3'-(p-bromophenyl)-7'-(p-chlorophenyl)-1-propylspiro-[piperidine-4,2'(1'H)-quinazolin]-4'(3'H)-one;

1-butyl-3'-(p-fluorophenyl)-6'-(phenylthio)spiro-[piperidine-4,2'(1'H)-quinazolin]-4'(3'H)-one;

1-ethyl-3'-(m-iodophenyl)-6'-methoxy-7'-methylspiro-[piperidine-4,2'(1'H)-quinazolin]-4'(3'H)-one;

6'-chloro-1,7'-dimethyl-3'-(p-tolyl)spiro[piperidine-4,2'(1'H)-quinazolin]-4'(3'H)-one;

3'-(p-anisyl)-1-ethyl-6'-(p-fluorophenyl)-7'-methylspiro[piperidine-4,2'(1'H)-quinazolin]-4'(3'H)-one;

3'-(p-ethoxyphenyl)-1-ethyl-7'-(o-tolyl)spiro[piperidine-4,2'(1'H)-quinazolin]-4'(3'H)-one;

7'-(p-fluorophenyl)-3'-(2-phenethyl)-1-propylspiro-[piperidine-4,2'(1'H)-quinazolin]-4'(3'H)-one;

3'-diethylaminomethyl-6'-propoxyspiro[piperidine-4,2'(1'H-quinazolin]-4'(3'H)-one;

7'-(p-ethoxyphenyl)-1-ethyl-3'-(dimethylaminoethyl)-spiro[piperidine-4,2'(1'H)-quinazolin]-4'(3'H)-one; and 3'-butyl-1-ethyl-6'-(p-iodophenyl)spiro[piperidine-4,2'(1'H)-quinazolin]-4'(3'H)-one.

Example IV

A mixture of 2-amino-5-chloro-N-butylbenzamide (9.58 g, 0.0424 m), 1-benzyl-4-piperidone (8.0 g, 0.0424 m), a catalytic amount of zinc chloride and 200 ml of xylene is refluxed for one and one-half hours over a Dean-Stark trap. The solution is evaporated and the residue recrystallized from ethyl acetate affording a crystalline solid (4.0 g, 24%). A second recrystallization from acetonitrile affords 1-benzyl-3'-butyl-6'-chlorospiro[piperidine-4,2'(1'H)-quinazolin]-4'(3'H)-one as a crystalline solid, m.p. 179–81° C. (uncorrected).

Anal. Calcd for $C_{23}H_{28}ClN_3O$: C, 69.42; H, 7.09; N, 10.56; Cl, 8.91.

Found: C, 69.35; H, 6.95; N, 10.76; Cl, 8.8.

In a similar manner, using the appropriate starting materials, the following compounds are provided:

7'-bromo-3'-methyl-1-(phenethyl)spiro[piperidine-4,2'(1'H)-quinazolin]-4'(3'H)-one;

1-(p-chlorobenzyl)-7'-phenethyl-3'-phenylspiro-[piperidine-4,2'(1'H)-quinazolin]-4'(H)-one;

1-[2-(p-bromophenyl)ethyl]-3'-(p-ethylphenyl)-6'-methoxyspiro[piperidine-4,2'(1'H)-quinazolin]-4'(3'H)-one;

3'-benzyl-7'-ethylthio-1-(p-fluorobenzyl)spiro-[piperidine-4,2'(1'H)-quinazolin]-4'(3'H)-one;

1-[2-(p-iodophenyl)ethyl]-3'-dimethylaminomethyl-7'-nitrospiro[piperidine-4,2'(1'H)-quinazolin]-4'(3'H)-one;

3'-butyl-6'-ethyl-7'-fluoro-1-(p-methylbenzyl)-spiro[piperidine-4,2'(1'H)-quinazolin]-4'(3'H)-one;

3'-(p-chlorophenyl)-6'-(p-ethylphenyl)-1-[2-(p-tolyl)-ethyl]spiro[piperidine-4,2'(1'H)-quinazolin]-4'(3'<⅔H)-one;

1-(p-methoxybenzyl)-6'-propyl-3'-(o-tolyl)spiro-[piperidine-4,2'(1'H)-quinazolin]-4'(3'H)-one; and 1-[2-(p-ethoxyphenyl)ethyl]-3'-ethyl-7'-(p-tolyl)-spiro[piperidine-4,2'(1'H)-quinazolin]-4'(3'H)-one.

Example V

A mixture of 2-amino-5-chlorobenzamide (10.4 g, 0.0612 m), 1-ethyl-3-piperidone hydrochloride (10.0 g, 0.0612 m) and trifluoroacetic acid (75 ml) is refluxed for 3 hours. The solution is evaporated and the residue treated with methylene chloride and aqueous sodium hydroxide. The methylene chloride extract is dried over anhydrous sodium sulfate and evaporated to dryness. The solid residue is recrystallized from benzene-hexane affording 6'-chloro-1-ethyl-spiro[piperidine-3,2'(1'H)-quinazolin]-4'(3'H)-one (12.5 g, 73%) as a crystalline solid, m.p. 134-6° C. (uncorrected).

Anal. Calcd for $C_{14}H_{18}ClN_3O$: C, 60.20; H, 6.50; N, 15.06.

Found: C, 60.40; H, 6.39; N, 14.82.

In a similar manner, using the appropriate starting materials, the following compounds are provided:

6'-bromo-3'-methylspiro[piperidine-3,2'(1'H)-quinazolin]-4'(3'H)-one;

3'-ethyl-6'-fluoro-1-methylspiro[piperidine-3,2'(1'H)-quinazolin]-4'(3'H)-one;

1-ethyl-8'-iodo-3'-phenylspiro[piperidine-3,2'(1'H)-quinazolin]-4'(3'H)-one;

1-benzyl-3'-(p-chlorophenyl)-6'-methylspiro[piperidine-3,2'(1'H)-quinazolin]-4'(3'H)-one;

3'-(p-bromophenyl)-1-phenethyl-7'-propylspiro-[piperidine-3,2'(1'H)-quinazolin]-4'(3'H)-one;

6'-benzyl-1-(p-chlorobenzyl)-3'-(p-fluorophenyl)-spiro[piperidine-3,2'(1'H)-quinazolin]-4'(3'H)-one;

6'-chloro-1,8'-diethyl-3'-propylspiro[piperidine-3,2'(1'H)-quinazolin]-4'(3'H)-one;

1-[2-(p-bromophenyl)ethyl]-3'-(o-iodophenyl)-6'-(phenethyl)spiro[piperidine-3,2'(1'H)-quinazolin]-4'(3'<⅔H)-one;

1-(p-iodobenzyl)-7'-phenyl-3'-(p-tolyl)spiro[piperidine-3,2'(1'H)-quinazolin]-4'(3'H)-one;

5'-(p-chlorophenyl)-3'-(m-ethylphenyl)-1-(p-fluoro-benzyl)spiro[piperidine-3,2'(1'H)-quinazolin]-4'(3'<⅔H)-one;

3'-(p-anisyl)-6'-(p-bromophenyl)-1-(p-methylbenzyl)-spiro[piperidine-3,2'(1'H)-quinazolin]-4'(3'H)-one;

1-ethylspiro[piperidine-3,2'(1'H)-quinazolin]-4'(3'H)-one;

3'-(p-ethoxyphenyl)-1-(p-ethylbenzyl)-6'-(o-fluorophenyl)spiro[piperidine-3,2'(1'H)-quinazolin]-4'(3'H)-one;

3'-benzyl-5'-(p-iodophenyl)-1-[2-(p-tolyl)ethyl]-spiro[piperidine-3,2'(1'H)-quinazolin]-4'(3'H)-one;

3'-benzyl-5',7'-diethylspiro[piperidine-3,2'(1'H)-quinazolin]-4'(3'H)-one;

1-(p-methoxybenzyl)-3'-phenethyl-6'-(p-tolyl)spiro-[piperidine-3,2'(1'H)-quinazolin]-4'(3'H)-one;

1-(p-anisyl)ethyl-8'-(p-ethylphenyl)-3'-(dimethylaminomethyl)spiro[piperidine-3,2'(1'H)-quinazolin]-4'(3'<⅔H)-one;

6'-(p-anisyl)-1-(p-ethoxybenzyl)-3'-(diethylaminomethyl)spiro[piperidine-3,2'(1'H)-quinazolin]-4'(3'H)-one;

6'-(p-ethoxyphenyl)-3'-(dimethylaminomethyl)spiro-[piperidine-3,2'(1'H)-quinazolin]-4'(3'H)-one;

3'-ethyl-7'-ethoxy-1-methylspiro[piperidine-3,2'(1'H)-quinazolin]-4'(3'H)-one;

1-benzyl-6'-ethoxy-3'-phenylspiro[piperidine-3,2'(1'H)-quinazolin]-4'(3'H)-one;

1-(p-chlorobenzyl)-3'-methyl-7'-(methylthio)spiro-[piperidine-3,2'(1'H)-quinazolin]-4'(3'H)-one;

1-benzyl-6'-chloro-3'-ethyl-8'-(p-tolyl)spiro-[piperidine-3,2'(1'H)-quinazolin]-4'(3'H)-one;

3'-benzyl-1-(p-ethylbenzyl)-6'-(ethylthio)spiro-[piperidine-3,2'(1'H)-quinazolin]-4'(3'H)-one;

1-(p-methoxybenzyl)-3'-phenethyl-7'-phenoxyspiro-[piperidine-3,2'(1'H)-quinazolin]-4'(3'H)-one;

1,3'-diethyl-6'-(phenylthio)spiro[piperidine-3,2'(1'H)-quinazolin]-4'(3'H)-one;

7'-ethyl-3'-methyl-1-(phenethyl)spiro[piperidine-3,2'(1'H)-quinazolin]-4'(3'H)-one;

1-[2-(p-bromophenyl)ethyl]-6'-nitrospiro[piperidine-3,2'(1'H)-quinazolin]-4'(3'H)-one; and 3'-ethyl-7'-trifluoromethyl-1-(p-methoxybenzyl)spiro-[piperidine-3,2'(1'H)-quinazolin]-4'(3'H)-one.

Example VI

A mixture of o-aminobenzamide (7.0 g, 0.0515 m), 2,2,6,6-tetramethyl-4-piperidone hydrochloride and trifluoroacetic acid (50 ml) is refluxed for 3 hours. The solution is evaporated and the residue dissolved in 50 ml of an aqueous tetrahydrofuran solution. When this solution is basified by the addition of 200 ml of a dilute sodium hydroxide solution a solid precipitates (4.1 g, 19%). Recrystallization of the crude product from n-propyl alcohol affords 2,2,6,6-tetramethylspiro[piperidine-4,2'(1'H)-quinazolin]-4'(3'H)-one as a crystalline solid, m.p. 169–70° C. (uncorrected).
Anal. Calcd for $C_{16}H_{23}N_3O$: C, 70.29; H, 8.48; N, 15.37.
Found: C, 70.56; H, 8.51; N, 15.66.

In a similar manner, using the appropriate starting materials, the following compounds are provided:

6'-bromo-2,2,3',6,6-pentamethylspiro[piperidine-4,2'(1'H-quinazolin]-4'(3'H)-one;

3'-ethyl-6'-fluoro-1,2,2,6,6-pentamethylspiro[piperidine-4,2'(1'H)-quinazolin]-4'(3'H)-one;

8'-iodo-2,2,6,6-tetramethyl-3'-phenylspiro[piperidine-4,2'(1'H)-quinazolin]-4'(3'H)-one;

3'-(p-chlorophenyl)-2,2,6,6,6'-pentamethylspiro-[piperidine-4,2'(1'H)-quinazolin]-4'(3'H)-one;

3'-(p-bromophenyl)-1-ethyl-2,2,6,6-tetramethyl-7'-propylspiro[piperidine-4,2'(1'H)-quinazolin]-4'(3'H)-one;

6'-benzyl-3'-(p-fluorophenyl)-2,2,6,6-tetramethyl-spiro[piperidine-4,2'(1'H)-quinazolin]-4'(3'H)-one;

6'-chloro-8'-ethyl-2,2,6,6-tetramethyl-1-(2-phenethyl)-3'-propylspiro[piperidine-4,2'(1'H)-quinazolin]-4'(3'H)-one;

3'-(o-iodophenyl)-2,2,6,6-tetramethyl-6'-(phenethyl)-spiro[piperidine-4,2'(1'H)-quinazolin]-4'(3'⅔H)-one;

2,2,6,6-tetramethyl-7'-phenyl-3'-(p-tolyl)spiro-[piperidine-4,2'(1'H)-quinazolin]-4'(3'H)-one;

5'-(p-chlorophenyl)-3'-(m-ethylphenyl)-2,2,6,6-tetramethylspiro[piperidine-4,2'(1'H)-quinazolin]-4'(3'<⅔H)-one;

3'-(p-anisyl)-1-(p-chlorobenzyl)-6'-(p-bromophenyl)-2,2,6,6-tetramethylspiro[piperidine-4,2'(1'H)-quinazolin]-4'(3'H)-one;

1-(o-bromobenzyl)-3'-(p-ethoxyphenyl)-6'-(o-fluoro-phenyl)-2,2,6,6-tetramethylspiro[piperidine-4,2'(1'H)-quinazolin]-4'(3'H)-one;

3'-benzyl-5'-(p-iodophenyl)-1-[3-(p-iodophenyl)propyl]-2,2,6,6-tetramethylspiro[piperidine-4,2'(1'H)-quinazolin]-4'(3'H)-one;

3'-benzyl-5',7'-diethyl-2,2,6,6-tetramethylspiro-[piperidine-4,2'(1'H)-quinazolin]-4'(3'H)-one;

2,2,6,6-tetramethyl-1-(p-fluorobenzyl)-3'-phenethyl-6'-(p-tolyl)spiro[piperidine-4,2'(1'H)-quinazolin]-4'(3'H)-one;

8'-(p-ethylphenyl)-2,2,6,6-tetramethyl-1-(p-methylbenzyl)-3'-(dimethylaminomethyl)spiro[piperidine-4,2'(1'H)-quinazolin]-4'(3'H)-one;

6'-(p-anisyl)-3'-diethylaminomethyl-1-[2-(p-ethylphenyl)ethyl]-2,2,6,6-tetramethylspiro[piperidine-4,2'(1'H)-quinazolin]-4'(3'H)-one;

6'-(p-ethoxyphenyl)-2,2,6,6-tetramethyl-3'-(dimethylaminomethyl)-spiro[piperidine-4,2'(1'H)-quinazolin]-4'(3'H)-one;

3'-ethyl-7'-ethoxy-2,2,6,6-tetramethylspiro[piperidine-4,2'(1'H)-quinazolin]-4'(3'H)-one;

6'-ethoxy-2,2,6,6-tetramethyl-3'-phenylspiro-[piperidine-4,2'(1'H)-quinazolin]-4'(4'H)-one;

2,2,3',6,6-pentamethyl-7'-(methylthio)spiro[piperidine-4,2'(1'H)-quinazolin]-4'(3'H)-one;

6'-chloro-3'-ethyl-2,2,6,6-tetramethyl-8'-(p-tolyl)-spiro[piperidine-4,2'(1'H)-quinazolin]-4'(3'H)-one;

3'-benzyl-1-(p-ethoxybenzyl)-6'-ethylthio-2,2,6,6-tetramethylspiro[piperidine-4,2'(1'H)-quinazolin]-4'(3'H)-one;

2,2,6,6-tetramethyl-1-(p-anisylmethyl)-3'-phenethyl-7'-phenoxyspiro[piperidine-4,2'(1'H)-quinazolin]-4'(3'H)-one;

3'-ethyl-2,2,6,6-tetramethyl-6'-(phenylthio)-spiro[piperidine-4,2'(1'H)-quinazolin]-4'(3'H)-one;

7'-ethyl-2,2,3',6,6-pentamethylspiro[piperidine-4,2'(1'H-quinazolin]-4'(3'H)-one;

2,2,6,6-tetramethyl-6'-nitrospiro[piperidine-4,2'(1'H)-quanizolin]-4'(3'H)-one; and 3'-ethyl-2,2,6,6-tetramethyl-7'-(trifluoromethyl)-spiro[piperidine-4,2'(1'H)-quinazolin]-4'(3'H)-one.

Example VII

A mixture of o-aminobenzamide (10.0 g, 0.0735 m), 3-quinuclidone hydrochloride (11.8 g, 0.0735 m) and acetic acid (75 ml) is refluxed for 3 hours. The solution is concentrated in vacuo, the residual solid is dissolved in water, filtered to remove insoluble material and the filtrate basified. The solid which separates is collected by filtration (16.0 g, 91%). Recrystallization from absolute ethanol affords spiro[quinazoline-2(1H), 3'-quinuclidin]-4(3H)-one as a crystalline solid, m.p. 287- C. decomposition (uncorrected).
Anal. Calcd for $C_{14}H_{17}N_3O$: C, 69.11; H, 7.04; N, 17.27.
Found: C, 68.89; H, 6.69; N, 17.42.

In a similar manner, using the appropriate starting materials, the following compounds are provided:

6-chlorospiro[quinazoline-2(1H), 3'-quinuclidin]-4(3H)-one;

6-bromo-3-methylspiro[quinazoline-2(1H), 3'-quinuclidin]-4(3H)-one;

3-ethyl-6-fluorospiro[quinazoline-2(1H), 3'-quinuclidin]-4(3H)-one;

8-iodo-3-phenylspiro[quinazoline-2(1H), 3'-quinuclidin]-4(3H)-one;

3-(p-chlorophenyl)-6-methylspiro[quinazoline-2(1H), 3'-quinuclidin]-4(3H)-one;

3-(p-bromophenyl)-7-propylspiro[quinazoline-2(1H), 3'-quinuclidin]-4(3H)-one;

6-benzyl-3-(p-fluorophenyl)spiro[quinazoline-2(1H), 3'-quinuclidin]-4(3H)-one;

6-chloro-8-ethyl-3-propylspiro[quinazoline-2(1H), 3'quinuclidinc]-4(3H)-one;

3-(o-iodophenyl)-6-(phenethyl)spiro[quinazoline-2(1H), 3'-quinuclidin]-4(3H)-one;

7-phenyl-3-(p-tolyl)spiro[quinazoline-2(1H), 3'-quinuclidin]-4(3H)-one;

5-(p-chlorophenyl)-3-(m-ethylphenyl)spiro[quinazoline-2(1H), 3'-quinuclidin]-4(3H)-one;

3-(p-anisyl)-6-(p-bromophenyl)spiro[quinazoline-2(1H), 3'-quinuclidin]-4(3H)-one;

3-(p-ethoxyphenyl)-6-(o-fluorophenyl)spiro[quinazoline-2(1H), 3'-quinuclidin]-4(3H)-one;

3-benzyl-5-(p-iodophenyl)spiro[quinazoline-2(1H), 3'-quinuclidin]-4(3H)-one;

3-benzyl-5,7-diethylspiro[quinazoline-2(1H), 3'-quinuclidin]-4(3H)-one;

3-phenethyl-6-(p-tolyl)spiro[quinazoline-2(1H), 3'-quinuclidin]-4(3H)-one;

8-(p-ethylphenyl)-3-(dimethylaminoethyl)spiro-[quinazoline-2(1H), 3'-quinuclidin]-4(3H)-one;

6-(p-anisyl)-3-(diethylaminoethyl)spiro[quinazoline-2(1H), 3'-quinuclidin]-4(3H)-one;

6-(p-ethoxyphenyl)-3-(dimethylaminoethyl)spiro-[quinazoline-2(1H), 3'-quinuclidin]-4(3H)-one;

3-ethyl-7-ethoxyspiro[quinazoline-2(1H), 3'-quinuclidin]-4(3H)-one;

6-ethoxy-3-phenylspiro[quinazoline-2(1H), 3'-quinuclidin]-4(3H)-one;

3-methyl-7-(methylthio)spiro[quinazoline-2(1H), 3'-quinuclidin]-4(3H)-one;

6-chloro-3-ethyl-8-(p-tolyl)spiro[quinazoline-2(1H), 3'-quinuclidin]-4(3H)-one;

3-benzyl-6-(ethylthio)spiro[quinazoline-2(1H), 3'-quinuclidin]-4(3H)-one;

3-phenethyl-7-phenoxyspiro[quinazoline-2(1H), 3'-quinuclidin]-4(3H)-one;

3-ethyl-6-(phenylthio)spiro[quinazoline-2(1H), 3'-quinuclidin]-4(3H)-one;

7-ethyl-3-methylspiro[quinazoline-2(1H), 3'-quinuclidin]-4(3H)-one;

6-nitrospiro[quinazoline-2(1H), 3'-quinuclidin]-4(3H)-one; and 3-ethyl-7-(trifluoromethyl)spiro[quinazoline-2(1H), 3'-quinuclidin]-4(3H)-one.

Example VIII

A mixture of 2-amino-5-chlorobenzamide (10.0 g, 0.0585m), alloxan (8.3 g, 0.0585 m) and trifluoroacetic acid (120 ml) is refluxed for 6 hours. The slurry is filtered and washed with ether, (14.5 g, 84%). Recrystallization twice from tetrahydrofuran-acetonitrile affords 6'-chlorospiro-[pyrimidine-5(2H), 2'(1'H)-quinazoline]-2,4,4',6(1H,3H,3'H)-tetrone as a crystalline solid, m.p. 209–10° C. decomposition (uncorrected).

Anal. Calcd for $C_{11}H_7ClN_4O_4$: C, 44.83; H, 2.39; N, 19.01; Cl, 12.01.

Found: C, 44.83; H, 2.38; N, 19.29; Cl, 12.29.

In a similar manner, using the appropriate starting materials, the following compounds are provided:

6'-bromo-3'-methylspiro[pyrimidine-5(2H), 2'(1'H)-quinazoline]-2,4,4',6(1H,3H,3'H)-tetrone;

3'-ethyl-6'-fluorospiro[pyrimidine-5(2H), 2'(1'H)-quinazoline]-2,4,4',6(1H,3H,3'H)-tetrone.

8'-iodo-3'-phenylspiro-[pyrimidine-5(2H), 2'(1'H)-quinazoline]-2,4,4',6(1H,3H,3'H)-tetrone;

3'-(p-chlorophenyl)-6'-methylspiro[pyrimidine-5(2H), 2'(1'H)-quinazoline]-2,4,4',6(1H,3H,3'H)-tetrone;

3'-(p-bromophenyl)-7'-propylspiro[pyrimidine-5(2H), 2'(1'H)-quinazoline]-2,4,4',6(1H,3H,3'H)-tetrone;

6'-benzyl-3'-(p-fluorophenyl)spiro[pyrimidine-5(2H), 2'(1'H)-quinazoline]-2,4,4',6(1H,3H,3'H)-tetrone;

6'-chloro-8'-ethyl-3'-propylspiro[pyrimidine-5(2H), 2'(1'H)-quinazoline]-2,4,4',6(1H,3H,3'H)-tetrone;

3'-(o-iodophenyl)-6'-(phenethyl)spiro[pyrimidine-5(2H), 2'(1'H)-quinazoline]-2,4,4',6(1H,3H,3'H)-tetrone;

7'-phenyl-3'(p-tolyl)spiro[pyrimidine-5(2H), 2'(1'H)-quinazoline]-2,4,4',6(1H,3H,3'H)-tetrone;

5'-(p-chlorophenyl)-3'-(m-ethylphenyl)spiro[pyrimidine-5(2H), 2'(1'H)-quinazoline]-2,4,4',6(1H,3H,3'H)-tetrone;

3'-(p-anisyl)-6'-(p-bromophenyl)spiro[pyrimidine-5(2H), 2'(1'H)-quinazoline]-2,4,4',6(1H,3H,3'H)-tetrone;

3'-(p-ethoxyphenyl)-6'-(o-fluorophenyl)spiro[pyrimidine-5(2H), 2'(1'H)-quinazoline]-2,4,4',6(1H,3H,3'H)-tetrone;

3'-benzyl-5'-(p-iodophenyl)spiro[pyrimidine-5(2H), 2'(1'H)-quinazoline]-2,4,4',6(1H,3H,3'H)-tetrone;

3'-benzyl-5',7'-diethylspiro[pyrimidine-5(2H), 2'(1'H)-quinazoline]-2,4,4',6H,3H,3'H)-tetrone;

3'-phenethyl-6'-(p-tolyl)spiro[pyrimidine-5(2H), 2'(1'H)-quinazoline]-2,4,4',6(1H,3H,3'H)-tetrone;

8'-(p-ethylphenyl)-3'-(dimethylaminomethyl)spiro-[pyrimidine-5(2H),2'(1'H)-quinazoline]2,4,4',6(1H,3H,3bu:H)-tetrone;

6'-(p-anisyl)-3'-(diethylaminoethyl)spiro[pyrimidine-5(2H), 2'(1'H)-quinazoline]-2,4,4',6(1H,3H,3'H)-tetrone;

6'-(p-ethoxyphenyl)-3'-(dimethylaminoethyl)spiro-[pyrimidine-5(2H), 2'(1'H)-quinazoline]-2,4,4',6(1H,3H,3'H)-tetrone;

3'-ethyl-7'-ethoxyspiro[pyrimidine-5(2H), 2'(1'H)-quinazoline]-2,4,4',6(1H,3H,3'H)-tetrone;

6'-ethoxy-3'-phenylspiro[pyrimidine-5(2H), 2'(1'H)-quinazoline]-2,4,4',6(1H,3H,3'H)-tetrone;

3'-methyl-7'-(methylthio)spiro[pyrimidine-5(2H), 2'(1'H)-quinazoline]-2,4,4',6(1H,3H,3'H)-tetrone;

6'-chloro-3'-ethyl-8'-(p-tolyl)spiro[pyrimidine-5(2H), 2'(1'H)-quinazoline]-2,4,4',6(1H,3H,3'H)-tetrone;

3'-benzyl-6'-(ethylthio)spiro[pyrimidine-5(2H), 2'(1'H)-quinazoline]-2,4,4',6(1H,3H,3'H)-tetrone;

3'-phenethyl-7'-phenoxyspiro[pyrimidine-5(2H), 2'(1'H)-quinazoline]-2,4,4',6(1H,3H,3'H)-tetrone;

3'-ethyl-6'-(phenylthio)spiro[pyrimidine-5(2H), 2'(1'H)-quinazoline]-2,4,4',6(1H,3H,3'H)-tetrone;

7'-ethyl-3'-methylspiro[pyrimidine-5(2H),2'(1'H)-quinazoline]-2,4,4',6(1H,3H,3'H)-tetrone;

6'-nitrospiro[pyrimidine-5(2H), 2'(1'H)-quinazoline]2,4,4',6(1H,3H,3'H)-tetrone; and 3'-ethyl-7'-(trifluoromethyl)spiro[pyrimidine-5(2H), 2'(1'H)-quinazoline]-2,4,4',6(1H,3H,3'H)-tetrone.

Example IX

A mixture of 2-amino-5-chlorobenzamide (6.91 g, 0.0405 m), 4-chromanone (6.0 g, 0.0405 m) and trifluoroacetic acid (75 ml) is refluxed for 5 hours and then evaported to dryness. The residual solid along with a catalytic amount of zinc chloride and 100 ml of xylene is refluxed for 8 hours over a Dean-Stark trap. The solution is evaporated and the residual solid treated with methylene chloride and aqueous sodium hydroxide. The methylene chloride extract is dried over anhydrous sodium sulfate and evaporated to dryness. The residue is triturated with ether and hexane giving a solid which upon recrystallization from ether affords 6'-chlorospiro-[chroman-4,2'(1'H)-quinazolin]-4'(3'H)-one (3.5 g, 29%) as a crystalline solid, m.p. 193–4° C. (uncorrected).
Anal. Calcd for $C_{16}H_{13}ClN_2O$: C, 63.90; H, 4.35; N, 9.31.
Found: C, 63.98; H, 4.40; N, 9.31.

In a similar manner, using the appropriate starting material, the following compounds are provided:

6'-bromo-3'-methylspiro[chroman-4,2'(1'H)-quinazolin]-4'(3'H)-one;

3'-ethyl-6'-fluorospiro[chroman-4,2'(1'H)-quinazolin]-4'(3'H)-one;

8'-iodo-3'-phenylspiro[chroman-4,2'(1'H)-quinazolin]-4'(3'H)-one;

3'-(p-chlorophenyl)-6'-methylspiro[chroman-4,2'(1'H-quinazolin]-4'(3'H)-one;

3'-(p-bromophenyl)-7'-propylspiro[chroman-4,2'(1'H-quinazolin]-4'(3'H)-one;

6'-benzyl-3'-(p-fluorophenyl)spiro[chroman-4,2'(1'H)-quinazolin]-4'(3'H)-one;

6'-chloro-8'-ethyl-3'-propylspiro[chroman-4,2'(1'H)-quinazolin]-4'(3'H)-one;

3'-(o-iodophenyl)-6'-(phenethyl)spiro[chroman-4,2'(1'H-quinazolin]-4'(3'H)-one;

7'-phenyl-3'-(p-tolyl)spiro[chroman-4,2'(1'H)-quinazolin]-4'(3'H)-one;

5'-(p-chlorophenyl)-3'-(m-ethylphenyl)spiro[chroman-4,2'(1'H)-quinazolin]-4'(3'H)-one;

3'-(p-anisyl)-6'-(p-bromophenyl)spiro[chroman-4,2'(1'H-quinazolin]-4'(3'H)-one;

3'-(p-ethoxyphenyl)-6'-(o-fluorophenyl)spiro[chroman-4,2'(1'H)-quinazolin]-4'(3'H)-one;

3'-benzyl-5'-(p-iodophenyl)spiro[chroman-4,2'(1'H)-quinazolin]-4'(3'H)-one;

3'-benzyl-5',7'-diethylspiro[chroman-4,2'(1'H)-quinazolin]-4'(3'H)-one;

3'-phenethyl-6'-(p-tolyl)spiro[chroman-4,2'(1'H)-quinazolin]-4'(3'H)-one;

8'-(p-ethylphenyl)-3'-(dimethylaminoethyl)spiro-[chroman-4,2'(1'H)-quinazolin]-4'(3'H)-one;

6'-(p-anisyl)-3'-(diethylaminoethyl)spiro[chroman-4,2'(1'H-quinazolin]-4'(3'H)-one;

6'-(p-ethoxyphenyl)-3'-(dimethylaminoethyl)spiro-[chroman-4,2'(1'H)-quinazolin]-4'(3'H)-one;

3'-ethyl-7'-ethoxyspiro[chroman-4,2'(1'H)-quinazolin]-4'(3'H)-one;

6'-ethoxy-3'-phenylspiro[chroman-4,2'(1'H)-quinazolin]-4'(3'H)-one;

3'-methyl-7'-(methylthio)spiro[chroman-4,2'(1'H)-quinazolin]-4'(3'H)-one;

6'-chloro-3'-ethyl-8'-(p-tolyl)spiro[chroman-4,2'(1'H)-quinazolin]-4'(3'H)-one;

3'-benzyl-6'-(ethylthio)spiro[chroman-4,2'(1'H)-quinazolin]-4'(3'H)-one;

3'-phenethyl-7'-phenoxyspiro[chroman-4,2'(1'H)-quinazolin]-4'(3'H)-one;

3'-ethyl-6'-phenylthio)spiro[chroman-4,2'(1'H)-quinazolin]-4'(3'H)-one;

7'-ethyl-3'-methylspiro[chroman-4,2'(1'H)-quinazolin]-4'(3'H)-one;

6'-nitrospiro[chroman-4,2'(1'H)-quinazolin]-4'(3'H)-one; and

3'-ethyl-7'-(trifluoromethyl)spiro[chroman-4,2'(1'H)-quinazolin]-4'(3'H)-one.

Example X

The hydrochloride salt of 1-methylspiro[piperidine-4,2'(1'H)-quinazolin]-4'(3'H)-one is prepared by admixing an ethanolic solution of the compound with a 1N aqueous solution of hydrochloric acid and, thereafter, removing the co-solvents under vacuum.

Other acid addition salts of the compounds described in the above examples may be prepared by similar procedures employing hydrobromic acid, hydroiodic acid, nitric acid, sulfuric acid, phosphoric acid, citric acid, tartaric acid, acetic acid, succinic acid, maleic acid and gluconic acid or other salt forming acids.

What is claimed is:

1. A compound having the formula:

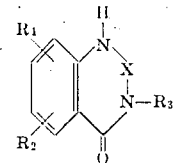

wherein $R_1$ is hydrogen and $R_2$ is hydrogen and halogen fixed in the 6' position; $R_3$ is hydrogen and lower alkyl; and X is selected from the group consisting of:

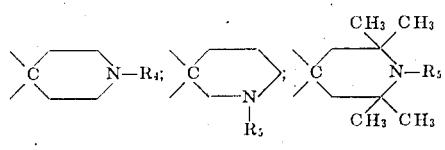

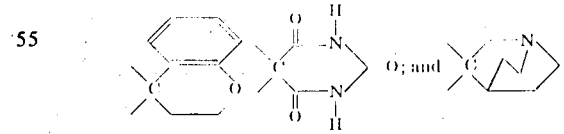

wherein $R_4$ and $R_5$ are independently hydrogen, lower alkyl, and benzyl.

2. A compound as described in claim 1 which is: 1-methylspiro[piperidine-4,2'(1'H)-quinazolin]-4'(3'H)-one.

3. A compound as described in claim 1 which is: 1-benzyl-3'-butyl-6'-chlorospiro[piperidine-4,2'(1'H)-quinazolin]-4'(3'H)-one.

4. A compound as described in claim 1 which is: 2,2,6,6-tetramethylspiro[piperidine-4,2'(1'H)-quinazolin]-4'(3'H)-one.

5. A compound as described in claim 1 which is: 6'-chloro-1-methylspiro[piperidine-4,2'(1'H)-quinazolin]-4'(3'H)-one.

6. A compound as described in claim 1 which is: 3'-butyl-6'-chloro-1-methylspiro[piperidine-4,2'(1'H)-quinazolin]-4'(3'H)-one.

7. A compound as described in claim 1 which is: spiro[quinazolin-2(1H), 3'-quinuclidin]-4(3H)-one.

8. A compound as described in claim 1 which is: 6'-chlorospiro[pyrimidine-5(2H), 2'(1H')-quinazoline]2,4,4'6-(1H, 3H, 3'H)-tetrone.

9. A compound as described in claim 1 which is: 6'-chloro-1-ethylspiro[piperidine-3,2'(1'H)-quinazolin]-4'(3'H)-one.

10. A compound as described in claim 1 which is: 6'-chlorospiro[chroman-4,2'(1'H)-quinazolin]-4'(3'H)-one.

* * * * *